United States Patent [19]
Moore et al.

[11] 3,933,459
[45] Jan. 20, 1976

[54] HIGH-MAGNESIUM AMMONIUM POLYPHOSPHATE SOLUTIONS
[75] Inventors: William Percy Moore, Hopewell, Va.; James Earl Sansing, Baton Rouge, La.
[73] Assignee: Allied Chemical Corporation, New York, N.Y.
[22] Filed: Oct. 11, 1974
[21] Appl. No.: 513,980

Related U.S. Application Data
[62] Division of Ser. No. 390,832, Aug. 23, 1973.

[52] U.S. Cl................ 71/34; 71/64 C; 21/60.5 R; 252/384; 423/306
[51] Int. Cl.² .......................................... C05B 7/00
[58] Field of Search ............... 21/2, 60.5 R, 60.5 A; 71/34, 64 C; 252/384; 423/306, 315

[56] References Cited
UNITED STATES PATENTS
2,950,961   8/1960   Striplin et al. ......................... 71/42
3,305,299   2/1967   Cohen et al. ..................... 21/60.5 R OTHER PUBLICATIONS
Search copy Def. Pub.; Jones, Def. Pub. search copy of serial No. filed June 21, 1971, Def. Pub. No. T900,026.

Primary Examiner—Charles N. Hart
Assistant Examiner—Ernest G. Therkorn
Attorney, Agent, or Firm—Fred L. Kelly

[57] ABSTRACT

A stable ammonium polyphosphate fertilizer solution having a relatively high amount of magnesium is prepared by mixing aqueous ammonia with wet-process superphosphoric acid in a reaction zone to give a $P_2O_5/N$ weight ratio within the range 3.6–4.0. The temperature of the reaction mixture is preferably maintained at about 50°–70°C. but the product solution should be cooled to about 25°–35°C. prior to storage. The product solution shows relatively low corrosion toward carbon steel storage tanks; however, to further reduce corrosion, the solution is preferably stored under a layer of liquid paraffin hydrocarbons.

2 Claims, No Drawings

HIGH-MAGNESIUM AMMONIUM POLYPHOSPHATE SOLUTIONS

This is a division of application Ser. No. 390,832, filed Aug. 23, 1973.

BACKGROUND OF THE INVENTION

This invention relates to production storage of high-magnesium ammonium polyphosphate solutions.

So-called wet-process phosphoric acid is conventionally produced by digesting phosphate rock with sulfuric acid which reacts to form phosphoric acid of a concentration of about 30% $P_2O_5$ by weight, and gypsum which is insoluble in the reaction products. The gypsum is separated from the phosphoric acid by the usual means such as filtration settling or both and the resultant weak acid may be used as an article of commerce. For many important commercial uses, such as, for example, production of liquid fertilizers, the weak acid is concentrated by evaporation to provide phosphoric acid containing about 50–70% $P_2O_5$.

While the wet-process for phosphoric acid is simple in concept, it is fraught with many technical difficulties, and the resultant phosphoric acid is a highly impure material, containing relatively large amounts of dissolved sulfates and smaller amounts of fluorides, fluosilicates and salts of aluminum, magnesium, iron and other metals. These impurities precipitate and settle out as solids or sludge at a slow rate occurring over an interval of many days and even months. The amount of solids which settle out varies with the purity of the phosphate rock from which the acid is derived and is generally from 0.5 to 10 percent weight of acid.

So-called superphosphoric acid containing at least 66% $P_2O_5$ content may be economically prepared by evaporating water from wet-process phosphoric acid. The term superphosphoric acid as used herein is defined as phosphoric acid containing substantial quantities of both ortho- and polyphosphoric acids. These polyphosphoric acids include pyrophosphoric acid and other linear polymers.

Ammonium polyphosphate solutions made from wet process phosphoric acid normally contain as metal impurities iron, aluminum and magnesium. Of these, magnesium occurs in smallest concentration but has the most deleterious effect on the stability of the ammonium polyphosphate solutions. Commercial ammonium polyphosphate solutions for fertilizer use normally are made with 45-65% of their $P_2O_5$ content as polyphosphate. It has been found that such solutions containing a $Mg/P_2O_5$ weight ratio of 0.0056 stored at ambient temperatures, will precipitate solids containing magnesium in about 4 months. Moreover, such solutions containing larger amounts of magnesium are much less stable, e.g., solutions containing a $Mg/P_2O_5$ weight ratio of 0.01 will precipitate solids containing magnesium in about 2 days. For purposes of this invention, the present stable, highmagnesium ammonium polyphosphate solutions are defined as solutions which remain stable for at least 250 days although they have a $Mg/P_2O_5$ weight ratio of at least 0.0056.

It is known that iron and aluminum ions present as predominant metal impurities in wet-process phosphoric acid, form gelatinous precipitates that render ammonium salt fertilizer solutions prepared therefrom thixotropic and gelatinous. U.S. Pat. No. 3,044,851 discloses that the formation of gelatinous iron and aluminum precipitates can be prevented by heating the acid to expel the fluoride impurities, and thereafter forming acyclic polyphosphoric acids, including pyrophosphoric acid, in the acid. Moreover, this patent discloses that magnesium requires a far higher concentration of polyphosphates to prevent precipitation than the same amount of other metal impurities and suggests that magnesium can be selectively removed from the dilute wet-process said by passing the acid over a cation exchange resin. Unfortunately, such treatment of the dilute wet-process acid is expensive and time consuming.

It has also been suggested to remove the magnesium impurity by "over ammoniation" of superphosphoric acid, analyzing at least 66% $P_2O_5$. The superphosphoric acid is diluted with water and then ammoniated to a $N/P_2O_5$ ratio of about 0.4 to precipitate the magnesium as a complex ammonium phosphate. This procedure has the disadvantage that substantial loss of phosphate occurs only a small proportion of the complex ammonium phosphate precipitate is magnesium.

U.S. Pat. No. 3,642,439 relates to a method of separating magnesium from wet-process phosphoric acid characterized in that the magnesium is separated as a readily filterable fluoride-phosphate complex compound containing magnesium and aluminum. The fluoride ion required for formation of the magnesiumcontaining precipitate is preferably formed by hydrolysis of fluroine compounds normally in the crude acid. In the case of insufficient quantities of any of said precipitation components, additions of such components are made to the acid or to the reaction components from which the acid is produced. The wet-process phosphoric acid low in magnesium is especially useful for production of stable ammonium polyphosphate fertilizer solutions.

These prior art methods for separating magnesium from wet-process phosphoric acid have made a substantial contribution to the development of commercial liquid fertilizers. However, the continuing heavy utilization of available phosphate rock resources has consumed most of the high grade rock which contains relatively small amounts of magnesium. Thus, much of the supply of phosphate rock presently available to the fertilizer industry contains so much magnesium that its removal is relatively expensive or even impractical. Accordingly, it is now considered highly desirable to develop a suitable process for producing a high-magnesium ammonium polyphosphate fertilizer solution which is stable during storage and use. Desirably, this stable, high-magnesium ammonium polyphosphate should be relatively non-corrosive to carbon steel equipment generally used during storage and utilization of the fertilizer solution.

SUMMARY OF THE INVENTION

It is one object of the present invention to establish a simple and economical process for producing a stable ammonium polyphosphate solution with a high magnesium content.

It is another object of the present invention to produce a stable ammonium polyphosphate solution with a high magnesium content.

It is an additional object of the present invention to maintain the magnesium content of an ammonium polyphosphate solution within the desired required limits.

It is still another object of the present invention to provide an improved method for controlling corrosiveness to ferrous metals of a high-magnesium ammonium polyphosphate solution.

In accordance with the present invention, aqueous ammonia and superphosphoric acid containing about 0.7–2.0% by weight MgO are mixed in a reaction zone to give a $P_2O_5/N$ weight ratio varying from 3.6 to 4.0. During the mixing, the reaction mixture is maintained at about 50°–100°C., preferably at 50°–70°C. The mixture is then cooled to about 25°–35°C. The resulting fertilizer solution is stable, i.e., it remains clear on storage for at least 250 days at 25°–35°C. The product is relatively non-corrosive toward carbon steel storage tanks provided that the pH of the solution is maintained at about 5.0–5.7 during storage. However, in order to further reduce corrosion, the solution is preferably stored under a layer of liquid paraffin hydrocarbons having a boiling point of about 150°–300°C.

PREFERRED EMBODIMENT OF THE INVENTION

Superphosphoric acid containing about 0.8–1.5% by weight MgO and generally 66–76% by weight $P_2O_5$, preferably 68–73% by weight $P_2O_5$, is mixed in a reaction zone with aqueous ammonia containing generally 24–40% by weight ammonia and preferably 30–40% by weight ammonia to result in a solution having a $P_2O_5/N$ weight ratio varying from 3.6 to 4.0, preferably from 3.65 to 3.8. Preferably, the reaction is at 50°–70°C. but product is cooled to 25°–35°C. prior to storage. Furthermore, the proportions of the aqueous ammonia and superphosphoric acid mixed is such that the pH of the reaction solution is within the range of 5.0–5.7 and preferably within the range 5.2–5.5. The superphosphoric acid used in the process should contain at least 50%, preferably 65–73%, of the total $P_2O_5$ in the form of polyphosphate. As indicated hereinabove, the product solution is relative noncorrosive toward mild steel provided that the pH of the solution is maintained at 5.0–5.7 but relatively severe corrosion occurs at the air-liquid interface during storage of the solution. However, we have found that this excessive corrosion at the airliquid interface can be effectively controlled by use of a thin layer of paraffin hydrocarbons on the surface of the product solution. Generally, a layer of oil about 0.05–0.2 inch in thickness is sufficient. Preferably, a mixture of paraffin hydrocarbons is used having a boiling point of about 150°–300°C.

In the following examples, all parts and percentages are by weight. These examples are an illustration of the invention and are not intended to limit the invention in any way.

EXAMPLE 1

The phosphate rock used in this example was obtained from phosphate mining operations in central Florida and was typical of the material now commercially available in that it contained relatively large amounts of magnesium impurities. This rock was acidulated with sulfuric acid in typical phosphoric acid production equipment using the so-called Prayon process. The weak acid produced contained 30.3% $P_2O_5$, 1.9% F, 0.32% MgO, 0.8% $Al_2O_3$ and 1.5% $Fe_2O_3$. The weak wet-process phosphoric acid was concentrated in conventional evaporators to 51% $P_2O_5$ concentration.

The concentrated phosphoric acid was fed to the bottom of a submerged-combustion-type evaporator where it was brought in contact with air and combustion gases having a temperature of about 700°C. On contacting the hot gases, the acid was heated to about 290°C., entrained in the gases and dehydrated to superphosphoric acid containing 0.79% MgO and 74.7% $P_2O_5$; 68% of the $P_2O_5$ content was in the polyphosphate form. The entrained acid product was separated from the gases and cooled. The superphosphoric acid was reacted with 24–40% aqueous ammonia at 50°–95°C. at various controlled ratios to produce aqueous ammonium phosphate fertilizer solutions. The numerous samples produced were cooled to 32°C. and stored for extended periods of time; storage performance was noted. The ratio of $P_2O_5/N$ in the samples was varied by changing the amount of $NH_3$ added while holding the $P_2O_5$ concentration at about 34–37%. In all the tests sulfate concentration was about 1.8%. The test samples were stored 120 days at 32°C. and the amount of solids precipitating from solution was measured in each sample. One sample which was adjusted to 3.3 $P_2O_5/N$ weight ratio at pH 6.1, precipitated to give 10% (by vol.) solids in the sample after 120 days. Another sample at 3.4 $P_2O_5/N$ weight ratio, at pH 6.0, showed 6.5% (by vol.) solids in the sample. The amount of precipitation decreased as $P_2O_5/N$ ratio was increased until it became insignificant at about pH 5.4–5.7 at 3.6–3.8 $P_2O_5/N$ weight ratio; moreover, these stable solutions remained stable for more than 250 days.

EXAMPLE 2

Corrosion measurements were made on the solutions of Example 1 at 32°C. using carbon steel (ASTM-1020). Corrosion rate was nearly constant at 1.0–1.4 mils per year as the $P_2O_5/N$ weight ratio was increased from 3.2 to 3.9; however, at $P_2O_5/N$ weight ratios higher than 3.9, corrosion rates increased sharply, e.g., going from 1.4 mils per year at 3.9 $P_2O_5/N$ weight ratio to 10.0 mils per year at 4.1 $P_2O_5/N$ weight ratio. In all samples, the corrosion rate was relatively greater at the air-liquid interface.

EXAMPLE 3

Product samples from Example 1 were treated with paraffin hydrocarbon oils to further reduce corrosion during storage. To a sample of the ammonium polyphosphate solution made at a $P_2O_5/N$ weight ratio of 3.4 was added 0.8% of a vacuumpump oil (a paraffin hydrocarbon oil) onto the surface of the solution. When the sample was agitated an emulsion was formed. When the same amount of the oil was added to another sample from Example 1 made at a $P_2O_5/N$ weight ratio of 3.75, the emulsion formed briefly upon agitation, but very quickly resolved to a floating thin layer of oil for corrosion protection. The corrosion rate on carbon steel was reduced from 1.4 to 0.6 mils per year. This small amount of oil provided an oil layer about 0.1 inch in thickness. Moreover, corrosion at the airliquid interface was practically nil. Similar results were obtained when a ⅛inch layer of ordinary 10W-30 motor oil was used in place of the vacuum pump oil. Also, similar results were obtained when the fertilizer solution was stored in aluminum storage tanks.

EXAMPLE 4

Superphosphoric acid having a content of about 72% $P_2O_5$ and about 1% MgO was mixed with about 33% aqueous ammonia at 50°–70°C. to give a solution having a $P_2O_5/N$ weight ratio of 3.7. The solution had a pH of about 5.5. The temperature in the reactor was controlled at 50°–70°C. by recycling a stream cooled to 35°C. The entire solution was then cooled to 35°C. and water was added to adjust the $P_2O_5$ content to 34%. The solution contained 0.48% MgO but remained clear when stored at pH 5.5 for 250 days. A similar sample having a $P_2O_5/N$ weight ratio of 3.4 precipitated solids in only 4 days.

EXAMPLE 5

Another series of ammonium polyphosphate solutions were prepared in a manner similar to that used in Example 1, except that the phosphate rock used was very low in magnesium content and controlled amounts of magnesium were added. Storage tests were run at 30°C. with all samples containing essentially 34% $P_2O_5$. The days of clear storage were measured for each sample to determine the length of storage which could be obtained before any appreciable precipitation occured. With a MgO concentration of 0.36% precipitation was appreciable after 50 days storage under conditions of 3.4 $P_2O_5/N$ weight ratio and pH 6. However, when the $P_2O_5/N$ weight ratio was increased to 3.65 and pH decreased to 5.55, the product was still clear after 350 days storage at pH 5.55. The contrast was still more significant when the MgO concentration of the solution was increased to 0.48%.

EXAMPLE 6

This example demonstrates that an even sharper break in precipitation tendency is obtained when the MgO concentration of the ammonium polyphosphate solution is relatively low and polyphosphate concentration is relatively high. Using the technique of Example 1, product containing 65% polyphosphate was produced with 0.35% MgO and 0.06% CaO. All samples contained approximately 37% $P_2O_5$. Storage tests were conducted for 120 days at 32°C. and the amount of wet solids precipitated was recorded. Solution made at 3.35 $P_2O_5/N$ weight ratio showed 10% (by vol.) solids. Solutions were perfectly clear after 120 days storage in the samples having $P_2O_5/N$ weight ratios of 3.6, 3.74, and 3.99.

We claim:

1. A process for producing and storing stable ammonium polyphosphate solutions containing at least 0.35% by weight MgO, comprising:
   a. mixing 24–40% by weight aqueous ammonia with superphosphoric acid containing 66–76% by weight $P_2O_5$ and 0.7–2.0% by weight MgO to give a reaction solution having a $P_2O_5/N$ weight ratio of 3.6–4.0 and a pH in the range 5.0–5.7;
   b. maintaining the temperature of the reaction at 50°–100°C.;
   c. cooling said reaction solution after mixing to a temperature of 25°–35°C.; and
   d. storing said solution at 25°–35°C. in a carbon steel tank, under a layer of liquid paraffin hydrocarbon having a boiling point of 150°–300°C., and at pH 5.0–5.7, whereby the solution remains stable and does not precipitate solids for at least 250 days, and shows a corrosion rate in said carbon steel tank of less than 1.4 mils per year, said corrosion rate being measured below the air-liquid interface of the solution.

2. The process of claim 1 wherein the layer of liquid paraffin hydrocarbon is about 0.05–0.2 inch in thickness.

* * * * *